United States Patent [19]
McLennan et al.
[11] 4,343,043
[45] Aug. 3, 1982

[54] RADIO HAVING A CRESCENDO AUDIO ALARM

[75] Inventors: Lloyd K. McLennan, Utica; Albert Lacell, Vernon, both of N.Y.
[73] Assignee: General Electric Company, New York, N.Y.

[21] Appl. No.: 217,210
[22] Filed: Dec. 17, 1980
[51] Int. Cl.³ H04B 1/16
[52] U.S. Cl. 455/231; 179/1 VL
[58] Field of Search 455/231, 232, 230, 234, 455/249; 179/1VL; 330/144, 145, 284

[56] References Cited

U.S. PATENT DOCUMENTS 2,930,000 3/1960 Seler 330/145
3,315,167 4/1967 Goldwasser 455/231
3,900,798 8/1975 Pomerantz et al. 455/231
3,931,621 1/1976 Rose 455/231

*Primary Examiner*—Marc E. Bookbinder
*Attorney, Agent, or Firm*—Carlos Nieves; George R. Powers; John R. Rafter

[57] ABSTRACT

In a radio circuit a detected audio signal is coupled by a volume control potentiometer to an audio amplifier which drives a speaker. The potentiometer is connected in series with a variable impedance which can be varied over a selectably predetermined time interval to increase the volume of the radio above the existing level set by the potentiometer. The variable impedance is provided by a resistor connected across the collector to emitter electrodes of a transistor, an R-C network coupled to the base electrode of the transistor and means for charging and discharging a capacitor of the network.

10 Claims, 3 Drawing Figures

RADIO HAVING A CRESCENDO AUDIO ALARM

BACKGROUND OF THE INVENTION

1. Field of the Invention

The subject invention generally relates to clock radios having an automatic turn-on feature and to radios which can be set to provide, automatically, a volume level capable of use as a wake-up alarm.

2. Description of the Prior Art

Clock radios which can be set to automatically go on at a higher volume than was being provided when the radio was turned off are at least constructively known. In one such radio, which is described in U.S. Pat. No. 2,930,000, a developed audio signal is applied to an amplifier which has an AC load (speaker) in parallel with a circuit which places, on a selective basis, one of two resistances in parallel with the load. The resistances affect the gain of the amplifier and, therefore, the volume of the radio. When the radio is turned on, the greater of the two resistors is automatically used in the circuit to produce a first volume level and when the other resistor is substituted the volume decreases. A typical mode of operation includes turning the radio on in the evening and selecting the low volume level for listening. If the radio is turned off but is programmed to go on, for example, in the morning, when the radio goes on it will provide audio at the higher volume level. It is noted that the high to low volume ratio is fixed by the values of the resistances.

SUMMARY OF THE INVENTION

It is an object of the present invention to provide a clock radio having an automatic turn on mode and means for gradually increasing the volume, from a level which is selectable, by an amount which is inversely related to the selected level.

It is another object of the present invention to provide a clock radio having an automatic turn-on mode and means for gradually increasing the volume during a predetermined time interval which begins soon after the radio is turned on.

The invention herein may be described broadly as a radio, having an audio alarm mode of operation such that when the alarm goes on the loudness of the audio output of the radio increases for a predetermined time interval. The radio includes: means for receiving a transmitted radio signal and providing an audio frequency electrical signal; an audio transducer; a variable impedance; and means, in series with the variable impedance, responsive to the electrical signal for driving the audio transducer to produce sound at a level which is selectable; and means for automatically varying the impedance during a predetermined time interval, thereby continuously and monotonically increasing the level of the sound above a selected level.

BRIEF DESCRIPTION OF THE DRAWINGS

The above-mentioned and other objects and features of the invention will become apparent by reference to the following description in conjunction with the accompanying drawing, in which.

DESCRIPTION OF A PREFERRED EMBODIMENT

Figure 1:
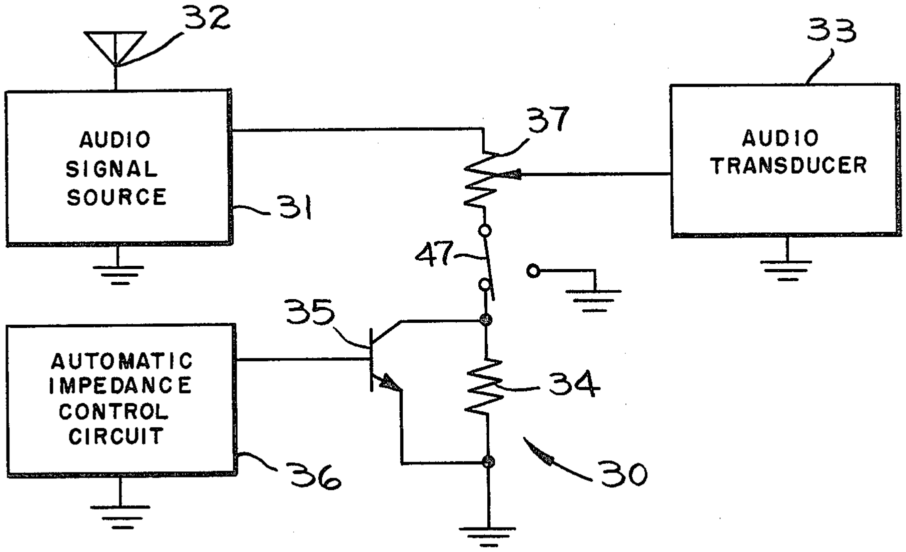
FIG. 1 is a block diagram of a radio including an audio alarm, according to the invention.

A block diagram of a radio 30, according to the invention, is shown in FIG. 1. In the figure, an audio signal source 31 and an associated antenna 32 represent means for receiving a transmitted radio signal and providing an audio frequency electrical signal. In this example, source 31 is a superheterodyne receiver having AM or FM modes of operation, the audio signal being provided by an AM or FM detector. A signal related to the audio frequency signal is coupled by volume control circuitry, described below, to an audio transducer 33 which includes an audio speaker driven by an audio amplifier. The volume control circuitry includes a variable impedance provided by a resistor 34 in parallel with a variable impedance located between the collector to emitter electrodes of a transistor 35. As will appear, the magnitude of the variable impedance is dependent on the magnitude of a voltage applied to the base electrode of the transistor by a control circuit 36. The variable impedance is connected to ground at one end and its other end is selectively coupled, as is shown by a potentiometer 37 to signal source 31. The wiper arm of the potentiometer is connected to the audio transducer 33 and provides said signal related to the audio frequency signal. With the variable impedance, for example, at a fixed level, the variable impedance and potentiometer function as a simple voltage divider and the magnitude of the voltage present on the wiper arm is selectable. The gain of the audio transducer in this example is substantially constant and, therefore, its output sound level is related to the position of the wiper arm.

Figure 2:
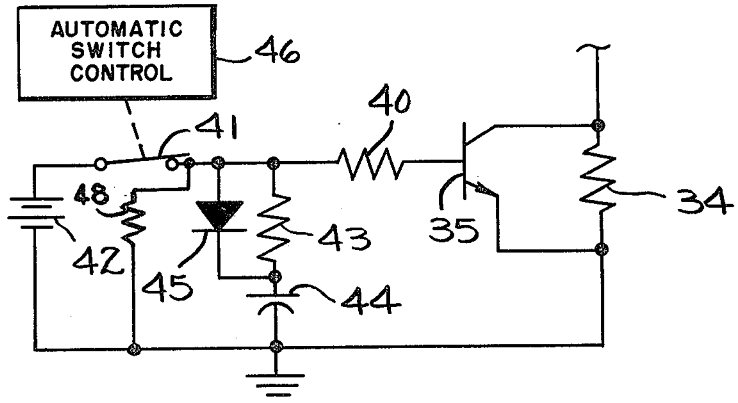
FIG. 2 is a schematic diagram of an automatic impedance control circuit of the radio disclosed in FIG. 1.

Transistor 35 is driven by control circuit 36 into saturation or cut-off. When the transistor operates in the saturation mode it effectively short circuits resistor 34 and when the transistor operates in the cut-off mode its output impedance is higher, by design, than resistor 34. Consequently, the voltage provided by the wiper, at a given position, and the volume provided by the transducer may be varied from a low level corresponding to operation of the transistor in saturation to a high level corresponding to operation of the transistor in the cut-off mode. The high level to low level voltage or volume ratio is greatest when the resistance between the wiper and resistor 34 is a minimum. The high level to low level voltage or volume ratio is smallest when the resistance between the wiper and the end of the potentiometer connected to source 31 is at a minimum value, corresponding to a maximum volume setting for the wiper arm. A time-varying voltage from control circuit 36 is applied to the base of transistor 35 to drive it from saturation to cut-off during a predetermined time interval. To generate the voltage control, circuit 36 includes (see FIG. 2) a resistor 40 which is connected at one end to the base of the transistor 35 and at the other of its ends to a switch 41. Although switch 41 is shown as a mechanical structure, it may be replaced by an electronic switch. One end of switch 41 and resistor 40 are also coupled to ground by a resistor 43 in series with a capacitor 44 and by a resistor 48. The other end of switch 41 is coupled to ground by a power supply 42. The value of resistor 40 is chosen such that with switch 41 closed transistor 35 is fully on. The anode of a diode 45 is connected to a point between switch 41 and resistor 43 and the cathode of the diode is connected to a point between resistor 43 and capacitor 41. Therefore, when switch 41 closes, capacitor 44 rapidly charges to a voltage substantially equal to the voltage provided by supply 42. With capacitor 44 charged, if switch 41 is opened, capacitor 44 discharges through resistor 43, resistor 40 and the non-linear input resistance provided by the transistor. As a result, the voltage at the base of the transistor drops towards a cut-off level at a rate which depends upon the values of the capacitor and the series resistances. Since the rate depends upon the values of circuit components, it should be appreciated that the control circuit automatically varies the value of the impedance coupling the potentiometer 37 to ground and that the variation occurs during a predetermined time interval governed by the circuit components.

An automatic switch control 46 determines whether switch 41 is in an open or closed position and includes a timer which, in this example, automatically turns the radio on at a selectable time and, thereafter, opens switch 41. The switch is kept open for a predetermined period of time and then closes. In operation, with switch 41 closed, the radio can be used to provide audio at a pleasing volume level. Thereafter, the radio can be turned off and the timer can be set to turn the radio back on at a selectable time. When the radio goes on, at the selected time, the initial volume level, assuming the wiper position of potentiometer 37 was not reset, is the same as when the radio was turned off. Thereafter, the volume level increases to provide an alarm function.

Referring to FIG. 1, potentiometer 37 is connected in series with resistor 34 by an arm, pole, and terminal of a single pole double throw switch 47, the other terminal of the switch being connected to ground. With the arm in contact with the terminal connected to resistor 34, operation of the radio is as described above. If the state of the switch is changed so that the arm is in contact with the grounded terminal, the loudness level of the radio will not increase automatically. With switch 47 in position such that the automatic loudness feature is removed from operation and with potentiometer 37 remaining at a set position, if the radio is turned on by the timer or manually, the volume level reached will be the same as the volume level which existed just before the radio was turned off.

Figure 3:
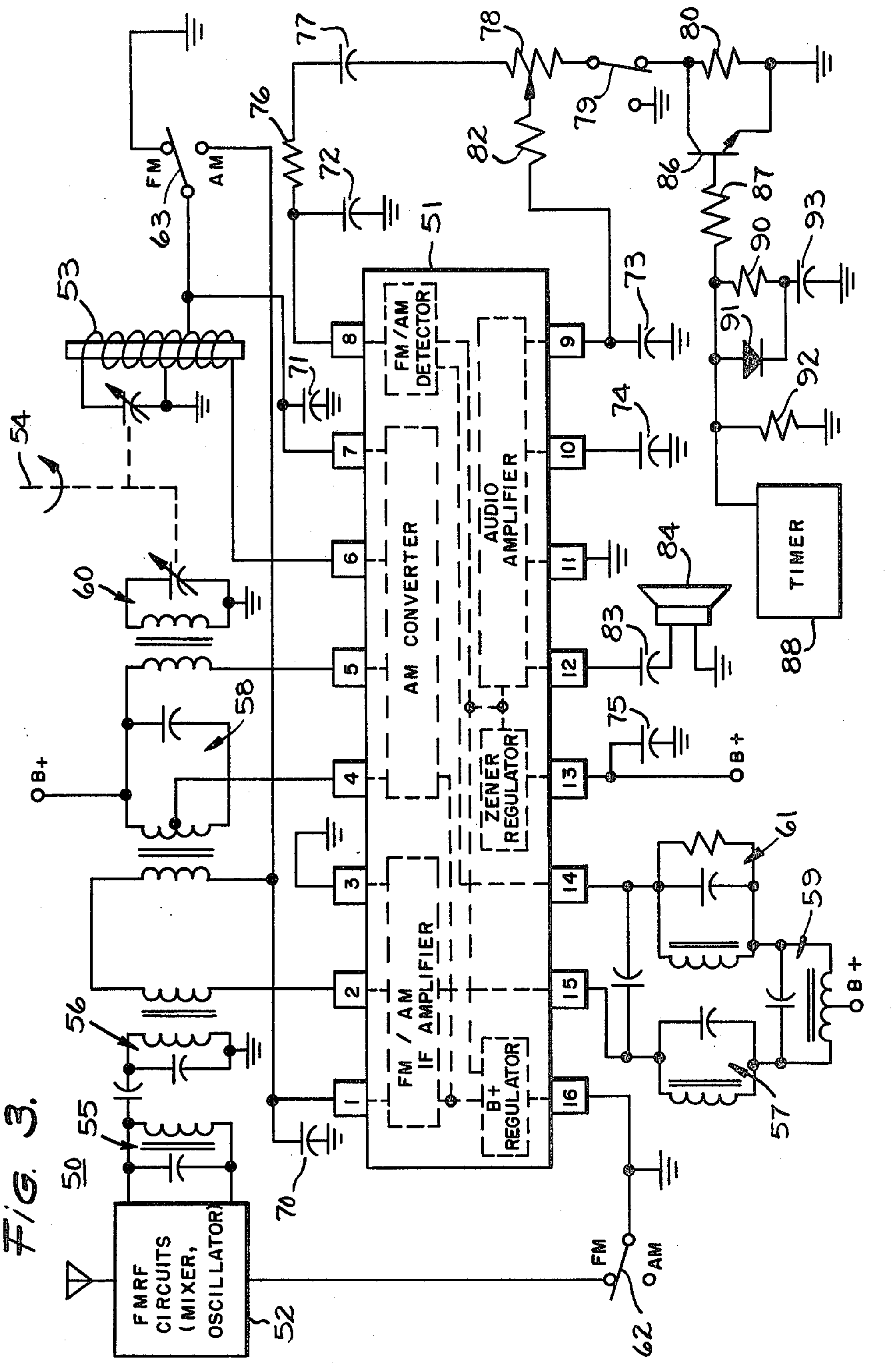
FIG. 3 is a schematic diagram of a radio which includes circuitry that incorporates the invention.

Referring to FIG. 3, a preferred embodiment of the invention is incorporated in a clock radio circuit 50 which includes an AM–FM integrated radio circuit 51, manufactured by Toshiba Corporation under part number TA7613P and described in IEEE Transactions on Consumer Electronics, Vol. 3, August 1977. As is typical in the design of radios with integrated circuit 51, the circuit is complemented with a tunable oscillator/mixer circuit 52 for coupling FM information from an antenna to the circuit; an AM antenna 53; and a tuning gang 54 for coupling AM information to the circuit. Circuit 51 is connected to FM IF tuned circuits 55, 56, 57, to AM IF tuned circuits 58 and 59; to AM local oscillator tuned circuit 60; to FM detector tuned circuit 61; and to AM/FM mode selector switches 62 and 63. Terminals 3, 11, and 16 of the circuit are connected to ground; and terminals 1, 7, 8, 9, 10 and 13 are coupled to ground by capacitors 70–75, respectively. Circuit 51 includes an FM/AM detector section connected to terminal 8 and capacitor 72 functions in an integrating or de-emphasis mode therewith. Terminal 8 provides an audio frequency signal recovered from a selected AM or FM signal received at one of the antennas to a number of series connected components. The series of components include an isolation resistor 76, a DC blocking capacitor 77, a volume control potentiometer 78, a single pole double throw selector switch 79, and a resistor 80 which is a part of a variable impedance circuit. A terminal of switch 79 and one end of resistor 80 are connected to ground and, therefore, potentiometer 78 is connected to ground either by switch 79 or resistor 80. The wiper arm of potentiometer 78 is connected by a resistor 82 to terminal 9 of circuit 51 and capacitor 73 which provides a low impedance path for frequencies above the audio range. Circuit 51 includes an audio amplifier section and terminals 9 and 12 are, respectively, the input and output ports of the amplifier. Terminal 12 is connected by a DC blocking capacitor 83 to a speaker 84, which is coupled to ground, and variations in the setting of the wiper arm of potentiometer 78 provide loudness variations in the output of the speaker. Resistor 80 and switch 79 are connected to the collector electrode of a transistor 86 whose emitter electrode is connected to ground and whose base electrode is connected by a resistor 87 to a timed source of DC power 88. As will be explained hereafter. Transistor 86 is driven by the timer 88 and other components between its saturation and cut-off regions and this varies the impedance between the potentiometer and ground. In going from saturation towards cut-off, the impedance increases and, assuming the wiper of the potentiometer is not moved in an offsetting manner, the volume of the audio provided by the speaker 84 increases. In addition to being connected to timer 88, resistor 87 is connected to one end of a resistor 90, to the anode of a diode 91, and to one end of a resistor 92, the other end of resistor 92 being grounded. The cathode of diode 91 is connected to the other end of resistor 90 and to one end of a capacitor 93, the other end of the capacitor being grounded. Timer 88 is capable of providing either 0 or 9 volts to resistor 87. When the timer provides 9 volts, resistor 87 allows enough base current to flow to keep transistor 86 close to or in the saturation region and capacitor 93 changes to substantially the 9 volt level through diode 91. When the timer output voltage switches from 9 volts to 0, the high impedance pull-down resistor 92 and the orientation of diode 91 cause the capacitor 93 to discharge substantially through resistors 90 and 87 and the increasing base-emitter diode impedance of transistor 86. As persons skilled in the art will appreciate, the time required to discharge the capacitor depends on the input resistance of the transistor, the value of the capacitor, and the values of resistors 87 and 90. During discharge of the capacitor, the transistor is driven towards cut-off, the variable impedance in series with potentiometer 78 increase, and the audio volume increases. Timer 88 includes a power supply in series with a switch (now shown) which is opened or closed on a selectable time basis. However, programmable clock radios are known, such as the 7-4880 model manufactured by the General Electric Company, wherein a timer for a function as described herein may be part of a keyboard responsive microprocessor, the keyboard being useful to establish times during which an output of the microprocessor corresponds to the 0 and 9 volt levels. In the 7-4880, a TI1100 microprocessor is used to provide keyboard tuning and storage features to the radio as well as alarm features and it should be noted that its use to provide an increasing volume or audio crescendo effect would be collateral.

A parts list to make the radio described with reference to FIG. 3 should include the following:

| COMPONENT | COMMERCIAL PART NO. OR VALUE |
|---|---|
| Diode 91 | IN3600 |
| Transistor 86 | 2N2222 |
| Speaker 84 | 16 ohms |
| Resistor 76 | 10K ohms |
| Potentiometer 78 | 50K ohms |
| Resistor 80 | 20K ohms |
| Resistor 82 | 470 ohms |
| Resistor 87 | 10K ohms |
| Resistor 90 | 10K ohms |
| Resistor 92 | 100K ohms |
| Capacitor 70 | 0.0047 uf |
| Capacitor 71 | 0.047 uf |
| Capacitor 72 | 0.0047 uf |
| Capacitor 73 | 0.0022 uf |
| Capacitor 74 | 220 uf |
| Capacitor 75 | 0.047 uf |
| Capacitor 77 | 0.022 uf |
| Capacitor 83 | 220 uf |
| Capacitor 93 | 1000 uf |

The AM IFT's and FM IFT's may be purchased under part numbers 867B831 and 671C857, respectively, from TOKO of Japan.

Using components such as set forth above and assuming that the setting of potentiometer 78 remains constant, when the timer voltage switches from 9 to 0 volts, it takes about 180 seconds for the loudness level of the radio to increase to within 10% of the steady state level corresponding to transistor 86 being in the cut-off region. Typically, the timer provides 0 volts for an hour after which it again provides 9 volts to resistor 87. In transitioning from 0 to 9 volts, transistor 86 moves from cut-off to saturation and the loudest level of audio coming out of the speaker decreases quickly to a steady state level corresponding to transistor 86 being in saturation. If desired, the increasing loudness feature of the radio can be rendered in operative by switching the arm of switch 79 into contact with its grounded terminal.

In a typical mode of operation with the arm of switch 79 coupled to resistor 80, the radio is set to provide a first audio volume level. If it is desired that the radio be used as an alarm, a wake-up time is set and the radio is turned off. At the wake-up time, the radio goes on at the first volume level and the volume level increases to a second level. The second level remains for an hour unless the arm of switch 79 is sooner connected to ground.

The apparatus described above may be modified by persons skilled in the art to which the invention pertains in ways which are consistent with the spirit of the invention. Therefore, it should be understood that the description herein of preferred embodiments, according to the invention, have been set forth as examples thereof and should not be construed or interpreted to limit the scope of the claims which follow and define the invention.

What is claimed is:

1. A radio comprising:
(a) circuit means for receiving a transmitted radio having a crescendo alarm signal and providing an audio frequency electrical signal;
(b) an audio transducer;
(c) a variable impedance means having minimum and maximum impedance levels;
(d) selector means in series with the variable impedance means and said circuit means and being responsive to the electrical signal, said selector means being further connected to the input of the audio transducer for providing said electrical signal for driving the audio transducer to produce sound at a first level established by a selected setting of said selector means and the minimum impedance level of said variable impedance means and a second level established by the selected setting of the selector means and the maximum impedance level of said variable impedance means; and
(e) timer means for automatically varying the impedance of said variable impedance means continuously and monotonically during a predetermined time interval, thereby increasing the level of the sound above the level corresponding to said selected setting.

2. A radio as defined in claim 1 wherein said variable impedance means includes a first resistor and a voltage controlled impedance connected across the resistor.

3. A radio as defined in claim 2 wherein the voltage controlled impedance is provided by a transistor, the emitter and collector being connected to different ends of said first resistor.

4. A radio as defined in claim 3 wherein said timer initiated means for automatically varying the impedance during a predetermined time interval includes: a capacitor; and means for charging the capacitor, for biasing the transistor on, and for discharging the capacitor through the transistor, thereby turning the transistor off.

5. A radio as defined in claim 4 wherein said means for charging the capacitor, for biasing the transistor, and for discharging the capacitor include: a power supply; switch means connected in series with the power supply; a second resistor which couples the switch means to the base electrode of the transistor; a third resistor which couples the switch means to the capacitor; a diode in parallel with the third resistor, the diode being connected to provide a low resistance path for charging the capacitor when the switch means is in a closed state; and timer means for automatically controlling the state of the switch means.

6. A radio as defined in claim 2 wherein said selector means includes a potentiometer.

7. A radio as defined in claim 6 wherein the voltage controlled impedance is provided by a transistor, the emitter and collector being connected to different ends of said first resistor.

8. A radio as defined in claim 7 wherein said timer initiated means for automatically varying the impedance during a predetermined time interval includes: a capacitor; and means for charging the capacitor, for biasing the transistor on, and for discharging the capacitor through the transistor, thereby turning the transistor off.

9. A radio having a crescendo alarm comprising:
(a) circuit means for receiving a transmitted radio signal and providing an audio frequency electrical signal;
(b) an audio transducer;
(c) a variable impedance means having minimum and maximum impedance levels;
(d) a switch having at least two positions;
(e) selector means in series with said circuit means and the variable impedance means when the switch is in a first of two positions and being responsive to the electrical signal, said selector means being further connected to the input of said audio transducer for providing said electrical signal for driving the audio transducer to produce sound at a first level established by a selected setting of said selector means and the minimum impedance level of said variable impedance means and a second level established by the selected setting of the selector means and the maximum impedance level of said variable impedance means; and (f) timer initiated means for automatically varying the impedance of said variable impedance means continuously and monotonically during a predetermined time interval, thereby increasing the level of the sound above the level corresponding to the selected setting if the switch is in the first position.

10. A radio as defined in claim 9 wherein said selector means includes a potentiometer and wherein said variable impedance means includes a first resistor and a voltage controlled impedance connected across the resistor.

* * * * *

UNITED STATES PATENT AND TRADEMARK OFFICE
CERTIFICATE OF CORRECTION

PATENT NO. : 4,343,043
DATED : August 3, 1982
INVENTOR(S) : Lloyd K. McLennan and Albert Lacell It is certified that error appears in the above—identified patent and that said Letters Patent is hereby corrected as shown below:

Col. 5, line 58: should read: A radio having a crescendo alarm comprising:

Col. 6, line 9: " " : timer initiated means

Signed and Sealed this

*Twenth-eighth* Day of *September 1982*

[SEAL]

*Attest:*

GERALD J. MOSSINGHOFF

*Attesting Officer* *Commissioner of Patents and Trademarks*